United States Patent [19]

van der Heijden

[11] Patent Number: 4,542,188
[45] Date of Patent: Sep. 17, 1985

[54] POLYMERIC FILMS HAVING ONE-SIDED CLING AND COMPOSITIONS USEFUL IN THEIR PREPARATION

[75] Inventor: Lambertus P. P. M. van der Heijden, Terneuzen, Netherlands

[73] Assignee: The Dow Chemical Company, Midland, Mich.

[21] Appl. No.: 325,080

[22] Filed: Nov. 25, 1981

[51] Int. Cl.$^4$ .................... C08L 23/06; C08L 23/20; C08L 23/16
[52] U.S. Cl. .................... 525/240; 524/528
[58] Field of Search ........................ 525/240

[56] References Cited

U.S. PATENT DOCUMENTS

| | | | |
|---|---|---|---|
| 3,682,767 | 8/1972 | Britton et al. | 525/240 |
| 4,076,670 | 2/1978 | Godfreid | 524/271 |
| 4,087,505 | 5/1978 | Sugimoto et al. | 525/240 |
| 4,222,913 | 9/1980 | Cooper | 525/227 |
| 4,311,808 | 1/1982 | Su | 525/222 |
| 4,337,188 | 6/1982 | Climenhage et al. | 524/528 |
| 4,362,835 | 12/1982 | Phillips | 525/240 |
| 4,367,256 | 1/1983 | Biel | 525/240 |
| 4,425,268 | 1/1984 | Cooper | 524/110 |

FOREIGN PATENT DOCUMENTS

| | | |
|---|---|---|
| 011930 | 6/1980 | European Pat. Off. |
| 1148326 | 4/1969 | United Kingdom |
| 1348836 | 3/1974 | United Kingdom |
| 2041949 | 9/1980 | United Kingdom |
| 1575894 | 10/1980 | United Kingdom |
| 2057459 | 4/1981 | United Kingdom |
| 1595604 | 8/1981 | United Kingdom |

Primary Examiner—Carman J. Seccuro

[57] ABSTRACT

A polymeric film prepared from a relatively crystalline polymer such as a copolymer of ethylene and an α-olefin having at least 3 carbon atoms, e.g., 1-octene (linear low density polyethylene); a relatively amorphous polymer such as low density polyethylene and a tackifying polymer such as a low molecular weight polybutene exhibits a substantially higher cling on one side than the other.

A film of a low density polyethylene, linear low density polyethylene and a low molecular weight polybutene also exhibits excellent film strengths and as unexpectedly high resistance to tear, particularly in the cross-direction.

12 Claims, No Drawings

POLYMERIC FILMS HAVING ONE-SIDED CLING AND COMPOSITIONS USEFUL IN THEIR PREPARATION

BACKGROUND OF THE INVENTION

The present invention relates to polymeric compositions, particularly, blends comprising two or more polymers and a tackifying agent, and to films prepared therefrom.

Olefinic polymers, particularly polymers of ethylene, are employed in a variety of end use applications including the preparation of wrapping films. In conventional wrapping processes, e.g. spin or rotary stretch wrapping techniques, the polymeric film is wound under tension around a package by either rotating the package on a turntable or by winding the film around a stationary package. In such applications, it is generally desirable for the overlapping portions of the film to adhere to each other thereby self-sealing the wrap without the need for an adhesive or heat sealing operation.

Conventionally, to impart the necessary tackiness or "cling" to the film, the polymers are blended with a tackifying agent such as polybutene, a terpene resin, hydrogenated rosin and rosin esters and a film subsequently prepared from the resulting blend. See, for example, U.S. Pat. No. 3,025,167; Swedish Patent Application No. 7807733-6 and European Patent Application No. 0011930. Unfortunately, the mere blending of such tackifying agents within an olefinic polymer imparts equal tack to both surfaces of the film prepared therefrom. Therefore, upon contact of the wrapped packages, the individual packages stick or cling to one another and, upon parting, there is a tendency for the wrappings to be disturbed or torn.

Alternatively, French Patent Application No. 2,031,801 describes a method for preparing a polymeric film having a tacky surface by coating a continuous polyethylene film with a layer of a copolymer of ethylene and vinyl acetate blended with polyisobutene, butyl rubber, polypropylene or atactic polybutene. While a film having cling primarily on one side may be prepared by coating only one surface of the polymeric film with said copolymer, the equipment and additional processing required to prepare the laminated film makes the film economically unattractive.

Alternatively, British Patent Specification No. 1,578,063 teaches that a polymeric film having one surface substantial more clingy than the other surface can be prepared by forming a film from a blend of polyisobutylene and polyethylene and thereafter treating one surface of the film with corona discharge. Unfortunately, the corona discharge treatment of the film requires the purchase and installation of additional process equipment thereby necessitating the expenditure of substantial time and capital.

In view of these deficiencies in polymeric films of the prior art, it remains highly desirable to provide a polymeric film having one surface tackier than the other surface which polymeric film possesses excellent physical properties.

SUMMARY OF THE INVENTION

Accordingly, in one aspect, the present invention is a polymeric blend comprising a first polymer, a second polymer and a tackifying agent, wherein the tackifying agent is employed in amounts sufficient to impart increased cling to at least one surface of a film prepared from the polymeric blend and the second polymer is employed in an amount and has sufficiently different crystallinity properties from the first polymer such that a film having preferential one-sided cling is capable of being prepared from the blend.

In another aspect, the present invention is a polymeric film comprising a first polymer, a second polymer and a tackifying agent; the tackifying agent being employed in an amount sufficient to impart increased cling to at least one surface of the film and the second polymer being employed in an amount and having crystallinity properties sufficiently different from the first polymer such that the film exhibits preferential one-sided cling.

In yet another embodiment, the present invention is a process for preparing said polymeric film, said process comprising the steps of (a) blending the first polymer, the second polymer and the tackifying agent; (b) extruding a film of the blend at temperatures sufficient to maintain the blend as a liquid and (c) cooling the extruded blend at rates sufficient to make a film having one side which has significant more cling than the opposite side.

Surprisingly, the polymeric blend of the present invention is readily extruded to form a film having one surface which exhibits an unexpectedly higher cling than the cling exhibited by the opposite side.

In a preferred embodiment of this invention, the first and second polymers are olefin polymers. More preferably, the first polymer is a polymer of ethylene, commonly referred to as low density polyethylene; the second polymer is a copolymer of ethylene and an α-olefin having 3 or more carbon atoms which is copolymerizable with ethylene, commonly referred to as a linear low density polyethylene; and the tackifying agent is a low molecular weight polybutene, preferably a polybutene of a molecular weight of less than about 2000. The second ethylene polymer has a sufficiently different crystallinity properties than the first ethylene polymer and the polybutene is employed in sufficient amounts such that a film having one surface significantly more clingy than the other surface can be prepared from the polymeric blend.

The films prepared from this preferred blend exhibit unexpectedly excellent physical properties in addition to showing preferential one sided cling. Specifically, the film exhibits a surprisingly improved resistance to tear propagation when compared to an identical blend containing no polybutene and excellent tensile and tear initiation strengths and energy.

The polymeric blends of the present invention are useful in the preparation of films, particularly self-sealing packaging films employed in a wide variety of applications such as fresh cut meats, bakery products and the like.

DETAILED DESCRIPTION OF THE PREFERRED EMBODIMENTS

Tackifying agents suitably employed herein are materials which, when blended with the first and second polymers as hereinafter described, are capable of imparting increased tackiness or cling to at least one surface of a film prepared therefrom. By the term "increased cling" it is meant that at least one major surface of a film prepared from a polymeric blend comprising the tackifying agent has a measurably higher cling than either major surface of a film prepared from an identical polymeric blend except having no tackifying agent therein. Preferably, the tackifying agent is capable of increasing the cling of at least one surface of the film by at least about 10 percent, more preferably about 25 percent. For the purposes of this invention, cling is measured by the method set forth in Note 5 of Table I. Representative materials useful as tackifying agents herein include hydrocarbon resins such as terpene resins, hydrogenated resins and resin esters, isotactic and atactic polypropylenes, polybutenes and the like. Of particular interest in the practice of the present invention are atactic polypropylene and the polybutenes, particularly polymers of isobutylene. The isobutylene polymers preferably employed have a relatively low molecular weight, i.e., a number average molecular weight less than about 2000, more preferably from about 600 to about 1500, wherein molecular weight is determined by gel permeation chromatography. Alternatively, the preferred atactic polypropylenes have a number average molecular weight of up to about 5000, more preferably from about 2000 to about 4000. Most preferably, the tackifying agent is polyisobutylene having a number average molecular weight from about 800 to about 1200.

The first and second polymers employed in the preparation of the polymeric blend of the present invention are polymers (homo and/or copolymers) derived from ethylenically unsaturated monomers which polymers exhibit sufficiently different crystallinity properties, e.g., degree of crystallinity, rate of crystallization and size of the resulting crystals, such that when blended with the tackifying agent in an effect amount, i.e., an amount sufficient to impart increased cling to at least on surface of the film, a film having preferential one-sided cling can be prepared. By "preferential one-sided cling" it is meant that the cling exhibited by one major surface of the film to itself is measurably higher than the cling exhibited by the other major surface of the film to itself. Often, in a film prepared using conventional techniques, the lower molecular weight tackifying agents e.g., low molecular weight polyisobutylenes, show essentially no preferential one-sided cling when blended with either the first or second polymer alone. Using such tackifying agent, preferential one-sided cling is exhibited when the polymers have sufficiently different crystallinity properties such that the cling of one major surface to itself is at least about 25, more preferably at least about 40, percent higher than the cling exhibited by the opposite surface. Alternatively, the polymers capable of imparting cling even though possessing relatively higher molecular weights, e.g., atactic polypropylene, often impart one-sided cling to a film comprising only one other polymeric component (i.e., either the first or second polymer). In such cases, the first and second polymers possess significantly different crystallinity properties to further increase the differences between the cling exhibited by the two major surfaces of the film.

The differences in the crystallinity properties necessary to impart the desired preferential cling will vary depending on the composition of each polymer, the relative proportions of each polymer in the composition and the relative crystallinity properties thereof. The degree of crystallinity is an indication of the crystallinity properties of the polymers and, in general, one polymer will have a degree of crystallinity from about 20 to about 40 and the other polymer will have a degree of crystallinity from about 35 to about 80, with the second polymer having a degree of crystallinity at least about 5 percent higher than the first polymer. For the purposes of this invention, the degree of crystallinity is measured using conventional techniques such as the combination of a thermal analyzer with a differential scanning calorimeter such as described in ASTM Test Method D-3417-75 or nuclear magnetic response techniques. In general, the difference in the degree of crystallinity between the first and second polymer required to achieve the desired preferential cling decreases as the degree of crystallinity of the polymers decreases. Specifically, a polymeric blend containing one polymer with of degree of crystallinity of about 40 percent can often be prepared as a film having the desired preferential cling when the second polymer exhibits as high as 35–36 percent. Alternatively, when one polymer exhibits a degree of crystallinity of about 80 percent, the other polymer will often need to exhibit a degree of crystallinity of less than about 70 percent to be capable of forming a film having the same preferential cling. In general, the preferred polymeric compositions of this invention will contain a first polymer having a degree of crystallinity of from about 20 to about 35 percent, more preferably a degree of crystallinity from about 20 to about 30 percent and a second polymer having a degree of crystallinity from about 35 to about 70, more preferably from about 40 to about 50 percent.

Representative of the ethylenically unsaturated monomers useful in the preparation of the first and/or second polymer of the polymeric composition are the olefinic monomers, i.e., polymerizable ethylenically unsaturated aliphatic hydrocarbons of one or more double bonds represented by the formula $H_2C=CHR$ where R is an alkyl or alkenyl group such as ethylene, propylene, 1-butene, 1-pentene, 4-methyl-1-pentene, 1-hexene, 1-octene, 1-decene, 1-dodecene and the like, including copolymers of one or more such olefinic monomers. Other ethylenically unsaturated monomers such as monovinylidene aromatics, e.g., styrene; halo-substituted olefinics, e.g., vinyl halide such as vinylchloride and vinylidene halide such as vinylidene chloride; esters of $\alpha,\beta$-ethylenically unsaturated carboxylic acids, e.g., alkyl acrylates; and vinyl esters of a carboxylic acids, e.g. vinyl acetate can also be employed. Although homopolymers of such ethylenically unsaturated monomers can often be employed, more advantageously such other monomers are copolymerized with an olefin, preferably ethylene. In general, such polymer advantageously comprises a large proportion of polymerized olefin, e.g., the polymer comprises at least about 80, preferably at least about 90, mole percent of the polymerized olefin and less than about 20, preferably less than about 10, mole percent of the polymerized other monomer, said mole percents being based on the total moles of monomer employed in preparing the polymers. In general, both the first and second polymers are derived from one or more olefin monomers, preferably ethylene.

The polymer exhibiting the lower degree of crystallinity, i.e., the first polymer, is preferably a homopolymer of ethylene or a copolymer of ethylene with minor amounts of vinylacetate, styrene and/or an alkylacrylate, more preferably a homopolymer of ethylene. In general, polymers of the desired relatively low crystallinity are prepared using conventional techniques well known in the art for preparing a low density polyethylene, i.e., density from 0.91 to 0.94 grams per cubic centimeter (g/cc) at 20° C. Illustrative of such techniques are described in U.S. Pat. Nos. 3,756,996 and 3,638,918.

Conventionally, such techniques involve polymerizing the monomers in a reactor, which advantageously has previously been purged with nitrogen or similarly inert gas, in the presence of a catalytic effective amount of a free radical polymerization catalyst, e.g., a peroxide such as di-tert-butylperoxide or tert-butylperacetate. Typically, the polymerization is conducted at relatively high pressures (e.g., from about 100 to about 3000 atmospheres) and temperatures (from about 50° C. to about 350° C.). In general, pressures from about 1000 to about 2000 atmospheres and temperatures from about 100° C. to about 300° C. are advantageously employed. Catalytic effective amounts of the initiator vary depending on the type of initiator employed and the monomers being polymerized but typically range from 0.1 to about 2 weight percent based on the weight of monomers introduced into the polymerization reactor. In addition to the free radical catalyst, small amounts of oxygen, e.g., from about 1 to about 100 weight parts per one million parts, by weight, of the monomer are generally advantageously introduced into the polymerization mixture. The polymerization can be conducted neat or in the presence of a solvent such as benzene, water, a saturated hydrocarbon such as methane or the like. Although a batch-type process can be employed in the preparation of the polymer, a continuous process employing an autoclave or tubular type reactor or combination of an autoclave and tubular reactor is advantageously employed. In such continuous process, the reactor is typically purged with nitrogen or other gas similarly inert to the polymerization reaction and subsequently with ethylene. Sufficient amounts of the monomer, polymerization catalyst (including oxygen, if desired) and the solvent, if employed, to yield the desired pressure when heated to the polymerization temperature, are thereafter added to the reactor. During the polymerization, additional ethylene can be added to maintain the pressure at the desired level. Further amounts of initiator and/or solvent, can also be added during the reaction. On completion of the reaction, free solvent and unreacted monomers are removed by stripping or some other suitable process to yield the desired polymer. The resulting polymers generally has a degree of crystallinity from about 20 to about 35, more typically from about 20 to 30, percent.

The polymer having the higher degree of crystallinity, i.e. the second polymer is also advantageously derived from ethylene and can be either a homopolymer or copolymer of ethylene. Most preferably, the second polymer is also a copolymer of ethylene with one or more α-olefin having 3 or more carbon atoms, particularly, a copolymer of ethylene with 1-butene or 1-octene. Advantageously, the copolymer will comprise from about 85 to about 99, preferably from about 93 to about 97, mole percent of polymerized ethylene and from about 15 to about 1, preferably from about 7 to about 3, mole percent of the other polymerized α-olefin employed in preparing the polymer.

Such polymers are preferably prepared having the desired higher degree of crystallinity using conventional techniques well known in the art for preparing said copolymers, which copolymers have been conventionally been referred to heretofore as "linear low density polyethylene" (i.e., have a density from about 0.91 to about 0.94). U.S. Pat. Nos. 2,825,721; 2,933,876; 3,250,825 and 4,204,050; and European Patent Application No. 0004966, all of which are hereby incorporated by reference, are illustrative of techniques for preparing the "linear low density polyethylenes". Such techniques involve polymerizing a mixture comprising the desired types and amounts of monomers in the presence of a catalytically effective amount of an organometallic catalyst (e.g., triethylaluminium plus titanium tetrachloride, a halide of the Group IV metals such as titanium tetrachloride, or a chromium oxide catalyst containing hexavalent chromium with silica, alumina or the like). A catalytic effective amount of such catalysts varies upon the polymerization conditions employed but generally ranges from about 0.01 to about 10 weight percent based on the weight of the ethylene being polymerized. Preferred catalysts for the preparation of the linear low density polyethylene are described in U.K. Patent Specification No. 1,500,873. Generally, the polymerization is conducted at relatively low pressures, e.g., from about 5 to about 40, preferably from about 5 to about 15, atmospheres, and temperatures from about 0° to about 300° C., more preferably from about 60° to about 160° C. The polymerization is conventionally conducted in the absence of water and oxygen and in a reaction diluent such as an alkane having from 3 to 12 carbon atoms, e.g., propane, or a alicyclic hydrocarbons, e.g., cyclohexane. The polymer is generally prepared in a continuous manner using either a mobile catalyst bed or fixed catalyst bed. Following the completion of the polymerization reaction, the reaction diluent and any unreacted monomers or volatile oligomers are removed from the polymeric product by conventional techniques, e.g., stripping. The resulting polymer generally exhibits a degree of crystallinity from about 35 to about 70, more typically about 40 to about 50 percent.

Less preferably, the second polymer is a homopolymer of ethylene. Homopolymers of ethylene having the desired degree of crystallinity are prepared using conventional techniques well known in the art for preparation of a high density polyethylene (i.e., polyethylene having a density of at least 0.94 g/cc at 20° C. with a density more advantageously being from about 0.96 to about 0.99 g/cc), which techniques are hereby incorporated by reference. In general, such techniques are similar to those employed in the preparation of a "linear low density ethylene polymer" and result in a polyethylene having a degree of crystallinity of at least about 70, more preferably at least about 80, percent.

The relative proportions of the first and second polymers, and tackifying agent most advantageously employed in the polymeric composition are dependent on a variety of factors including the composition and properties, e.g. degree of crystallinity of each polymer, the tackifying agent employed and the desired properties of the polymeric composition and the films prepared therefrom (e.g., desired preferential one-sided cling). In general, the desired composition is prepared using from about 45 to about 90 weight percent of the first polymer, from about 45 to about 10 weight percent of the second polymer, and from about 1 to about 10 weight percent of the tackifying agent, said weight percent being based on the total weight of the first and second polymers and tackifying agent. Using the preferred ethylene polymers and atactic polypropylene or polyisobutylene tackifying agent, films of excellent properties are advantageously prepared from a polymeric composition comprising from about 55 to about 90 weight percent of the low density ethylene polymer, from about 40 to about 5 weight percent of the high density of linear low density ethylene polymer and from about 2 to about 10 weight percent of the atactic polypropylene and/or polyisobutylene. Compositions which are particularly useful in the preparation of films comprise from about 65 to about 85, more preferably from about 65 to about 80 weight percent of a low density (e.g., 0.91–0.94 g/cc at 20° C.) homopolymer of ethylene from about 35 to about 20, weight percent of a linear low density polyethylene of a copolymer of ethylene and an α-olefin of 3 or more carbon atoms, and from about 2 to about 10, more preferably from about 3 to about 8, weight percent of a polyisobutylene, particularly a polyisobutylene having a number average molecular weight from about 800 to about 1200.

Optionally, other additives such as antioxidants, e.g., phenyl-β-naphthylamine, antifogging agents, dyes, plasticizers, pigments and the like can be employed in the polymeric blend of the present invention. In general, such other additives are well known in the art and reference is made hereto for the purposes of this invention. Such additives can be incorporated in the polymeric blend either during blending of the remaining components of during the extrusion process.

The first and second polymers and tackifying agent are blended at the desired proportions to form an essentially uniform blend of the polymers and tackifying agent. In general, any of a variety of known blending techniques can be employed. For example, the polymers and tackifying agent can be blended at a temperature above the softening point of the first and second polymer on a roll mill, internal (Banbury) mixer or similar mixing device until a mixture having the desired homogeneity is obtained. Temperatures in the range from about 125° C. to about 200° C. are generally preferred for such blending. Alternatively, the two polymers and tackifying agent can be dissolved in a common solvent and the resulting blend recovered by precipitation or the like, or the two polymers can be dry blended and subsequently extruded by melting the dry blend.

The resulting blend can be prepared in the form of a film using any of a variety of film-forming techniques. In general, the blend is extruded as a film at temperatures sufficient to maintain the blend as a liquid (i.e., melt of the blend), preferably at temperatures from about 190° to about 260° C., and subsequently cooling the extruded film at conditions sufficient to prepare a film of preferential one-sided cling. For example, a melt of the blend can be extruded through a die, preferably a slit die and solidified (i.e., cooled) on a chill roll. Alternatively, and more preferably, a melt of the blend is extruded to form a tubular film using so-called blown film, "bubble" extrusion techniques and the blown, tubular film subsequently cooled by subjecting a surface of the film to a stream of air or other suitable gas which is advantageously at low temperatures, e.g., from about 20° to about 30° C.

In the preparation of films having preferential one-sided cling, the rate at which each surface is cooled has been found to significantly affect the difference in cling exhibited between the opposite surfaces of the film. Specifically, as a first surface of the film is cooled at a progressively higher rate than a second surface, the second surface exhibits a progressively higher cling than the first surface. Therefore, to maximize the difference in cling exhibited by the two major surfaces, in the preparation of a film employing the "bubble" processing techniques, the exterior surface of the bubble or tubular film is generally advantageously cooled using relatively high flow rates of air while the interior surfaces of the bubble or tubular film are either not cooled or cooled using lower flow rates of air and/or higher temperature air. The different rates at which the opposite surfaces of the film are most advantageously cooled to achieve the desired preferential one-sided cling vary depending on numerous factors including the extrusion and subsequent cooling techniques employed, the composition of the blend and the thickness of the resulting film and are easily determined by experimentation. In the preparation of a film from the preferred polymeric blends using "bubble" processing techniques, while applying no direct, external cooling to the interior surface of the tube, to obtain films having the desired preferential one-sided cling, the outside surface of the tube or bubble is generally advantageously cooled at rates such that the frost line height, i.e., the height above the extruder at which the film initially becomes milky white in appearance, is from about 1 to about 20 centimeters (cm). More preferably, while applying no direct, external cooling to the inner surface of the tube, the outer surface of the tube is cooled by following air thereover at rates sufficient to achieve of a frost line height from about 2 to about 15, most preferably from about 5 to about 10, cm.

The thickness of the films are generally determined by the end use application of the resulting film. In general, films having preferential one-sided cling are advantageously prepared at thicknesses from about 10 to about 200 microns, preferably from about 20 to about 50 microns. Films having a greater thickness can also be produced when end use application dictates.

The following examples are set forth to illustrate the present invention and should not be constructed to limit its scope. In the example, all parts and percentages are by weight unless otherwise indicated.

EXAMPLE 1

Polymeric compositions are prepared by dry blending the various amounts, specified in Table I, of a homopolymer of ethylene having a degree of crystallinity of about 30 percent, a density of 0.92 g/cc at 20° C. and a melt index of about 1.0 and a copolymer of 95.5 mole percent of polymerized ethylene and 4.5 mole percent of polymerized 1-octene, said copolymer having a degree of crystallinity of about 55 percent, a density of 0.921 g/cc at 20° C. and a melt index of about 2.0; with 3.5 parts per 96.5 parts of the other polymers of a polyisobutylene having a number average molecular weight of about 820 (Sample Nos. 1–3). For purposes of comparison, a composition (Sample No. C-1) is prepared by blending 3.5 parts of an identical polyisobutylene with 96.5 parts of a homopolymer of ethylene identical to that employed in preparing Sample Nos. 1–3. In addition, a composition (Sample No. C-2) is prepared by blending 3.5 parts of the polyisobutylene with 96.5 parts of a copolymer of ethylene and 1-butene identical to that employed in preparing Samples 1–3.

Each of the resulting compositions is prepared as a film having a thickness of 40 micron by extruding a melt of the dry blend maintained at a temperature of about 215° C. using a conventional film extruder and blown film or "bubble" processing techniques. Cooling of each of the resulting tubular films is conducted by blowing ambient temperature air across the external film surface only at a rate sufficient to achieve a frost line height of about 5 cm.

Each of the resulting films is tested for tensile strength and tensile energy, tear initiation and propagation strength and energy in both the machine and cross direction. In addition, both sides of the resulting film are tested for cling strength and energy. The results of this testing are set forth in Table I.

EXAMPLE 2

In a manner to that of Example 1, films are prepared

TABLE 1

| SAMPLE NO. | POLYMERIC COMPOSITION WGT. PERCENT (1) | | | TENSILE (2) | | TEAR INITIATION (3) | | TEAR PROPAGATION (4) | | CLING, kg/6 cm² (5) | |
|---|---|---|---|---|---|---|---|---|---|---|---|
| | A | B | C | STRENGTH kg/cm² | ENERGY kgcm/cm³ | STRENGTH kg/cmd | ENERGY kg/cmd | STRENGTH kg/cmd | ENERGY kg/cmd | INSIDE/ INSIDE | OUTSIDE/ OUTSIDE |
| C-1* | 96.5 | 0 | 3.5 | | | | | | | 0.58 | 0.57 |
| MD | | | | 196 | 511 | 96 | 292 | 69 | 213 | | |
| CD | | | | 157 | 675 | 65 | 131 | 71 | 377 | | |
| 1 | 72.5 | 24 | 3.5 | | | | | | | 0.75 | 0.45 |
| MD | | | | 324 | 1389 | 132 | 563 | 90 | 442 | | |
| CD | | | | 272 | 1447 | 78 | 178 | 95 | 419 | | |
| 2 | 48.25 | 48.25 | 3.5 | | | | | | | 0.77 | 0.28 |
| MD | | | | 262 | 853 | 127 | 592 | 89 | 463 | | |
| CD | | | | 251 | 1263 | 88 | 205 | 94 | 400 | | |
| 3 | 24 | 72.5 | 3.5 | | | | | | | 0.66 | 0.33 |
| MD | | | | 295 | 1155 | 136 | 625 | 101 | 487 | | |
| CD | | | | 242 | 1066 | 82 | 200 | 103 | 540 | | |
| C-2* | 0 | 96.5 | 3.5 | | | | | | | <0.2 | <0.2 |
| MD | | | | 353 | 1612 | 101 | 412 | 105 | 538 | | |
| CD | | | | 332 | 1570 | 105 | 308 | 109 | 620 | | |

*Not an example of the present invention.
(1) The polymeric composition is recorded as weight percents wherein A is the homopolymer of ethylene, B is the copolymer of ethylene and 1-octene and C is polyisobutylene.
(2) Tensile strength and energy are measured using ASTM test method D-882-756.
(3) Tear propagation strength and energy are measured using ASTM test method D-1938,67.
(4) Tear initiation strength and energy are measured using ASTM test method D 1004,66.
(5) Cling is measured on a film 14 days after initially preparation by overlapping 40 mm of a 15 mm wide strip of a surface of the film on itself. A 10 kilogram (kg) weight is placed on the overlapping material for 2 minutes immediately thereafter, the sample is placed on an Instron Tensile Tester and pulled apart at a cross-head speed of 50 mm per minute. Cling is then the strength, in gm, required to pull the test film apart at the overlap. The inside/inside cling is a measurement of the cling of the inside (non-cooled) surface of the blown tubular film to itself and the outside/outside cling is a measurement of the cling of the outside (cooled) surface of the blown tubular film to itself.

As evidenced by the data in the foregoing Table, the polymeric blend comprising both the relatively highly crystalline polymer with the lower crystalline polymer impacts significantly more cling to one surface of the film than the other. Alternatively, when the polyisobutylene tackifying agent is employed with the higher or lower crystalline polymer alone, both surfaces exhibit essentially the same cling. In addition, a film prepared from a blend comprising only small amounts of the ethylene/1-octene polymer exhibits properties which closely approximate the excellent properties of that copolymer.

polymeric compositions (Sample Nos. 1-3) which comprise the various amounts as specified in Table II of a homopolymer of ethylene and an ethylene/1-octene copolymer identical to those employed in Example 1 and a polyisobutylene tackifying agent. For purposes of comparison, films are prepared from the homopolymer of ethylene having no copolymer or tackifying agent therein (Sample No. C-1) and from a blend of a homopolymer of ethylene and a copolymer of ethylene and 1-octene without the polyisobutylene tackifying agent (Sample No. C-2). The resulting films are tested for tensile strength and energy, tear initiation and propagation strengths and energies, in both the machine and cross direction and cling. The results of this testing are set forth in Table II.

TABLE 2

| SAMPLE NO. | POLYMERIC COMPOSITION WGT. PERCENT (1) | | | TENSILE (2) | | TEAR INITIATION (3) | | TEAR PROPAGATION (4) | | CLING, kg/6 cm² (5) | |
|---|---|---|---|---|---|---|---|---|---|---|---|
| | A | B | C | STRENGTH kg/cm² | ENERGY kgcm/cm³ | STRENGTH kg/cmd | ENERGY kg/cmd | STRENGTH kg/cmd | ENERGY kg/cmd | INSIDE/ INSIDE | OUTSIDE/ OUTSIDE |
| C-1* | 100 | 0 | 0 | | | | | | | — | — |
| MD | | | | 213 | 581 | 100 | 274 | 63 | 171 | | |
| CD | | | | 181 | 861 | 67 | 140 | 67 | 316 | | |
| C-2* | 75 | 25 | 0 | | | | | | | — | — |
| MD | | | | 250 | 812 | 115 | 406 | 75 | 340 | | |
| CD | | | | 262 | 1330 | 76 | 182 | 94 | 654 | | |
| 1 | 81.5 | 15 | 3.5 | | | | | | | 875 | 305 |
| MD | | | | 243 | 685 | 106 | 369 | 73 | 312 | | |
| CD | | | | 206 | 1121 | 77 | 201 | 96 | 665 | | |
| 2 | 71.5 | 25 | 3.5 | | | | | | | 800 | 175 |
| MD | | | | 265 | 885 | 116 | 430 | 77 | 368 | | |
| CD | | | | 249 | 1320 | 77 | 180 | 191 | 891 | | |
| 3 | 61.5 | 35 | 3.5 | | | | | | | 760 | 210 |
| MD | | | | 271 | 1020 | 116 | 462 | 84 | 463 | | |

TABLE 2-continued

| SAMPLE NO. | POLYMERIC COMPOSITION WGT. PERCENT (1) | | | TENSILE (2) | | TEAR INITIATION (3) | | TEAR PROPAGATION (4) | | CLING, kg/6 cm² (5) | |
|---|---|---|---|---|---|---|---|---|---|---|---|
| | A | B | C | STRENGTH kg/cm² | ENERGY kgcm/cm³ | STRENGTH kg/cmd | ENERGY kg/cmd | STRENGTH kg/cmd | ENERGY kg/cmd | INSIDE/INSIDE | OUTSIDE/OUTSIDE |
| CD | | | | 230 | 1281 | 82 | 218 | 98 | 743 | | |

*Not an example of the present invention.
(1) Same as Note (1) in Table 1.
(2) Same as Note (2) in Table 1.
(3) Same as Note (3) in Table 1.
(4) Same as Note (4) in Table 1.
(5) Same as Note (5) in Table 1, except cling was tested 1 week after initial film formation. Samples C-1 and C-2 exhibit essentially no cling.

As evidence by the data in the foregoing Table, films prepared from the polymeric composition of the ethylene homopolymer having a relatively low degree of crystallinity, a copolymer of ethylene and 1-octene having a relatively higher degree of crystallinity and a low molecular weight polyisobutylene possess one surface having substantially higher cling than the opposite surface. In addition, the combination of the low molecular weight polyisobutylene cling additive with the ethylene polymers does not adversely affect the physical properties of films prepared therefrom. In fact, the resistance to tear, as evidenced by tear propagation energy in the cross-direction is unexpectedly increased upon the addition of the polyisobutylene to the ethylene polymers.

EXAMPLE 3

A polymer composition identical to Sample No. 1 of Example 2 is prepared. A film prepared by the blown tube techniques employed in Example 1 and having a stream of air passed over the external surface of the tube at a cooling rate such that the frost line height of the tubular film is 5 cm imparts to the resulting film an inside/inside cling of 825 g. and an outside/outside cling of 305 g. When the rate of cooling the extruded film is decreased to a level such that the frost line height is 20 cm. the resulting film has an inside/inside cling of 815 g. and an outside/outside cling of 410 g. When the cooling rate is yet further reduced to give a first line height of 40 cm to the extruded film, the inside/inside cling is 540 g. and the outside/outside cling is 480 g. As evidence by such testing, as the cooling rate decreases, the differences between the cling on the surfaces of the resulting film also decrease. Similar results are obtained when polymeric compositions identical to Sample Nos. 2 and 3 of Example 2 are tested in the same manner.

What is claimed is:

1. A polymeric blend comprising from about 65 to about 80 weight percent of a low density homopolymer of ethylene, from about 20 to about 35 weight percent of a linear low density ethylene copolymer of ethylene and an α-olefin of 3 or more carbon atoms and from about 2 to 10 weight percent of a polyisobutylene or atactic polypropylene tackifying agent, said weight percents being based on the total weight of the ethylene polymers and tackifying agent, wherein, within the foregoing compositional limitations, the tackifying agent is employed in an amount and the linear low density ethylene copolymer has a sufficiently higher crystallinity than the low density polyethylene such that a film having preferential one-sided cling can be prepared from the blend without corona discharge treatment of the film.

2. The polymeric blend of claim 1 wherein the polymeric blend contains from about 3 to about 8 weight percent of the tackifying agent.

3. The polymeric blend of claim 2 wherein the tackifying agent is atactic polypropylene having a number average molecular weight from about 2000 to about 4000.

4. The polymeric blend of claim 2 wherein the tackifying agent is a polymer of isobutylene having a number average molecular weight from about 600 to about 1500.

5. The polymeric blend of claim 4 wherein the low density polyethylene has a degree of crystallinity from about 20 to about 40 percent, the linear low density polyethylene has a degree of crystallinity from about 35 to about 80 percent and the linear low density polyethylene has a degree of crystallinity at least about 5 percent higher than the low density polyethylene.

6. The polymeric blend of claim 4 wherein the linear low density polyethylene is a copolymer of from about 85 to 99 mole percent polymerized ethylene and from about 15 to 1 mole percent of a polymerized α-olefin having 3 or more carbon atoms.

7. The polymeric blend of claim 6 wherein the linear low density polyethylene is a copolymer of ethylene with 1-butene or 1-octene and has a degree of crystallinity from about 40 to about 50 percent and the polyisobutylene tackifying agent has a number average molecular weight from about 800 to about 1200.

8. A film having preferential one-sided cling prepared from the polymeric blend of claim 1.

9. A film having preferential one-sided cling prepared from the polymeric blend of claim 3.

10. A film having preferential one-sided cling prepared from the polymeric blend of claim 4.

11. A film having preferential one-sided cling prepared from the polymeric blend of claim 7.

12. A film having preferential one-sided cling without corona discharge treatment prepared from a polymeric blend comprising from about 65 to about 80 weight percent of a homopolymer of ethylene having a density from 0.91 to about 0.94 g/cc at 20° C. and a degree of crystallinity from about 20 to 30 percent, from about 35 to about 20 weight percent of a copolymer of from about 85 to about 99 mole percent polymerized ethylene with from about 15 to about 1 mole percent polymerized α-olefin having 3 or more carbon atoms and having a degree of crystallinity from about 40 to about 50 percent and from about 3 to about 8 weight percent of a polymer of isobutylene having a number average molecular weight from about 800 to about 1200, said weight percents being based on the total weight of the first and second polymers and tackifying agent.

* * * * *

UNITED STATES PATENT AND TRADEMARK OFFICE
CERTIFICATE OF CORRECTION

PATENT NO. : 4,542,188
DATED : September 17, 1985
INVENTOR(S) : Lambertus P.P.M. van der Heijden It is certified that error appears in the above—identified patent and that said Letters Patent is hereby corrected as shown below:

Col. 3, line 33, "on" should read -- one --;
Col. 4, line 12, "with of" should read -- with a --;
Col. 4, line 68, "3,638,918" should read -- 3,628,918 --;
Col. 5, line 43, "has" should read -- have --;
Col. 5, line 65, "2,933,876" should read -- 2,993,876 --;
Col. 6, line 23, "hydrocarbons" should read -- hydrocarbon --;
Col. 7, line 21, "of" should read -- or --;
Col. 8, line 21, delete "of";
Col. 8, line 32, "constructed" should read -- construed --;

Signed and Sealed this

Eighteenth Day of March 1986

[SEAL]

Attest:

DONALD J. QUIGG

Attesting Officer

Commissioner of Patents and Trademarks